(12) United States Patent
Rajwat et al.

(10) Patent No.: US 10,831,981 B2
(45) Date of Patent: Nov. 10, 2020

(54) UPDATING DOCUMENTS BASED ON USER INPUT

(71) Applicant: Facebook, Inc., Menlo Park, CA (US)

(72) Inventors: Paresh Jayant Rajwat, San Jose, CA (US); Asad K. Awan, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 472 days.

(21) Appl. No.: 15/072,843

(22) Filed: Mar. 17, 2016

(65) Prior Publication Data

US 2017/0270078 A1 Sep. 21, 2017

(51) Int. Cl.
*G06F 40/186* (2020.01)
*G06F 40/106* (2020.01)

(52) U.S. Cl.
CPC .......... *G06F 40/106* (2020.01); *G06F 40/186* (2020.01)

(58) Field of Classification Search
CPC ................................................ G06F 17/30905
See application file for complete search history.

(56) References Cited

U.S. PATENT DOCUMENTS

| | | | |
|---|---|---|---|
| 9,405,845 B2 * | 8/2016 | Obasanjo | G06F 16/40 |
| 9,648,080 B2 * | 5/2017 | Ying | G06F 40/106 |
| 10,540,153 B2 * | 1/2020 | Stachura | G06F 8/34 |
| 2013/0086078 A1 * | 4/2013 | Malleshaiah | G06Q 30/0269 707/748 |
| 2013/0086499 A1 * | 4/2013 | Dyor | G06Q 30/02 715/766 |
| 2014/0115111 A1 * | 4/2014 | Duskin | G06Q 30/0255 709/219 |
| 2014/0137043 A1 * | 5/2014 | Matas | G06F 3/0488 715/835 |
| 2015/0019943 A1 * | 1/2015 | Ying | G06F 40/186 715/204 |
| 2017/0031915 A1 * | 2/2017 | Moxon | H04L 67/306 |

* cited by examiner

*Primary Examiner* — Scott T Baderman
*Assistant Examiner* — Mario M Velez-Lopez
(74) *Attorney, Agent, or Firm* — Baker & Hostetler LLP

(57) ABSTRACT

In one embodiment, a computer system provides a document for display in a non-browser application of a client device of a user associated with a social-networking system, wherein the application is associated with the social-networking system, a layout of the document corresponds to a first document template, and the document includes content items corresponding to elements, wherein each element is a container for a content item, and information corresponding to characteristics of users of the social-networking system. The computer system determines a characteristic associated with a user, wherein the characteristic is associated with a preferred layout based on a type of content item associated with each element. The computer system selects an alternate document template based on the characteristic, including a set of elements. The computer system provides the document with content items corresponding to the set of elements and configured in accordance with the alternate document template for display.

20 Claims, 13 Drawing Sheets

UPDATING DOCUMENTS BASED ON USER INPUT

TECHNICAL FIELD

This disclosure generally relates to providing content to users of a social-networking system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a document including one or more elements may be provided to a user, wherein the one or more elements may be containers for content items. In some embodiments, a characteristic of a user of a social-networking system may be determined. In some embodiments, based on the characteristic, an alternate document template may be selected, wherein the alternate document template includes a first set of elements from the one or more elements of the document. A document may be provided for display to the user that includes content items corresponding to the first set of elements and configured in accordance with the alternate document template.

In particular embodiments, a graphical user interface for composing documents may be provided to a composing user. In some embodiments, the graphical user interface may include a first document template associated with the composing user. The composing user may provide user input that includes a selection of one or more content items for creating one or more documents. The one or more documents may be created by automatically associating each of the content items with an element based on the first document template. The one or more documents may be provided for distribution to a user.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
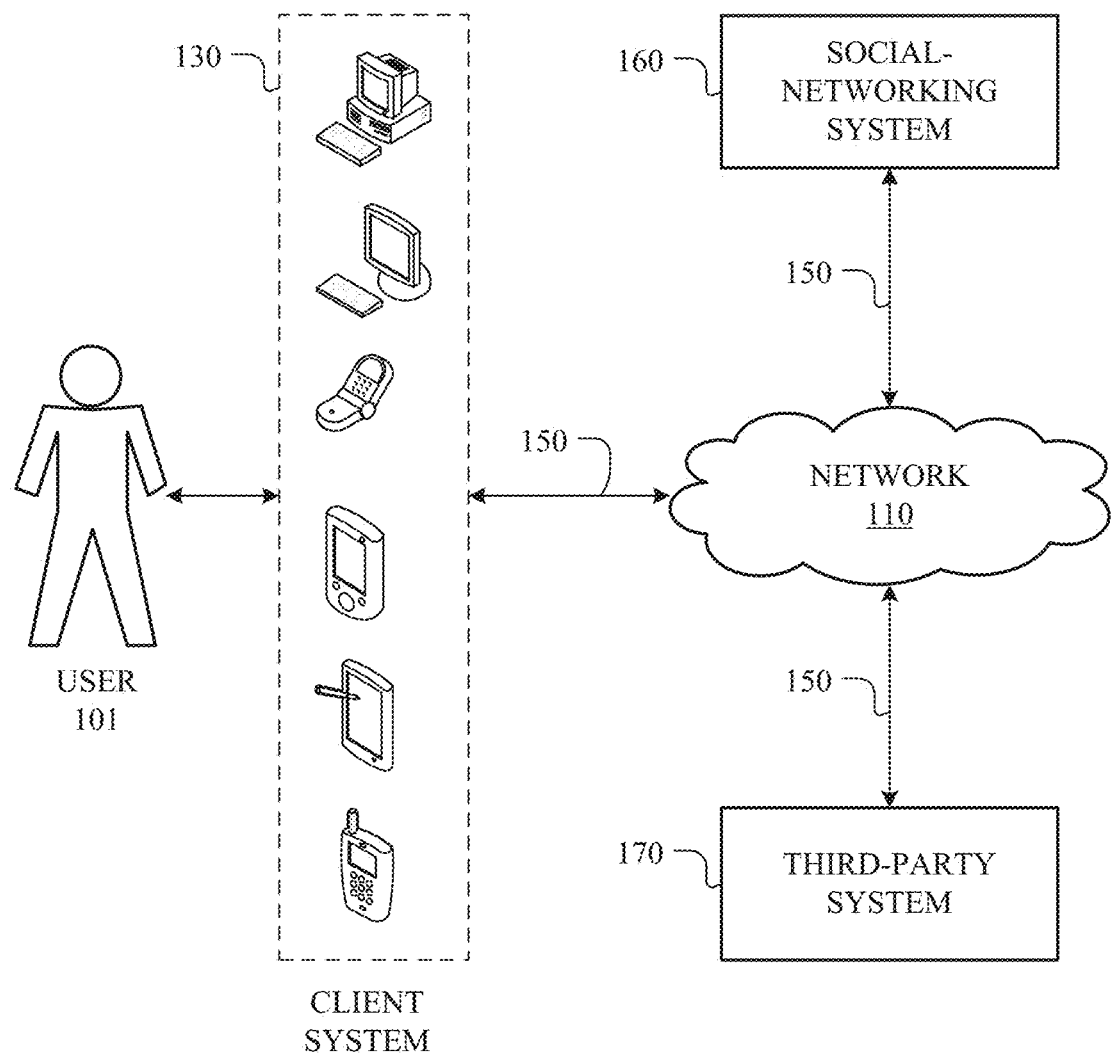
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system. Third-party system 170 may generate, store, receive, and send content items, such as, for example, text, images, video, or any other content item. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, a tablet computer, or an augmented/virtual reality device.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
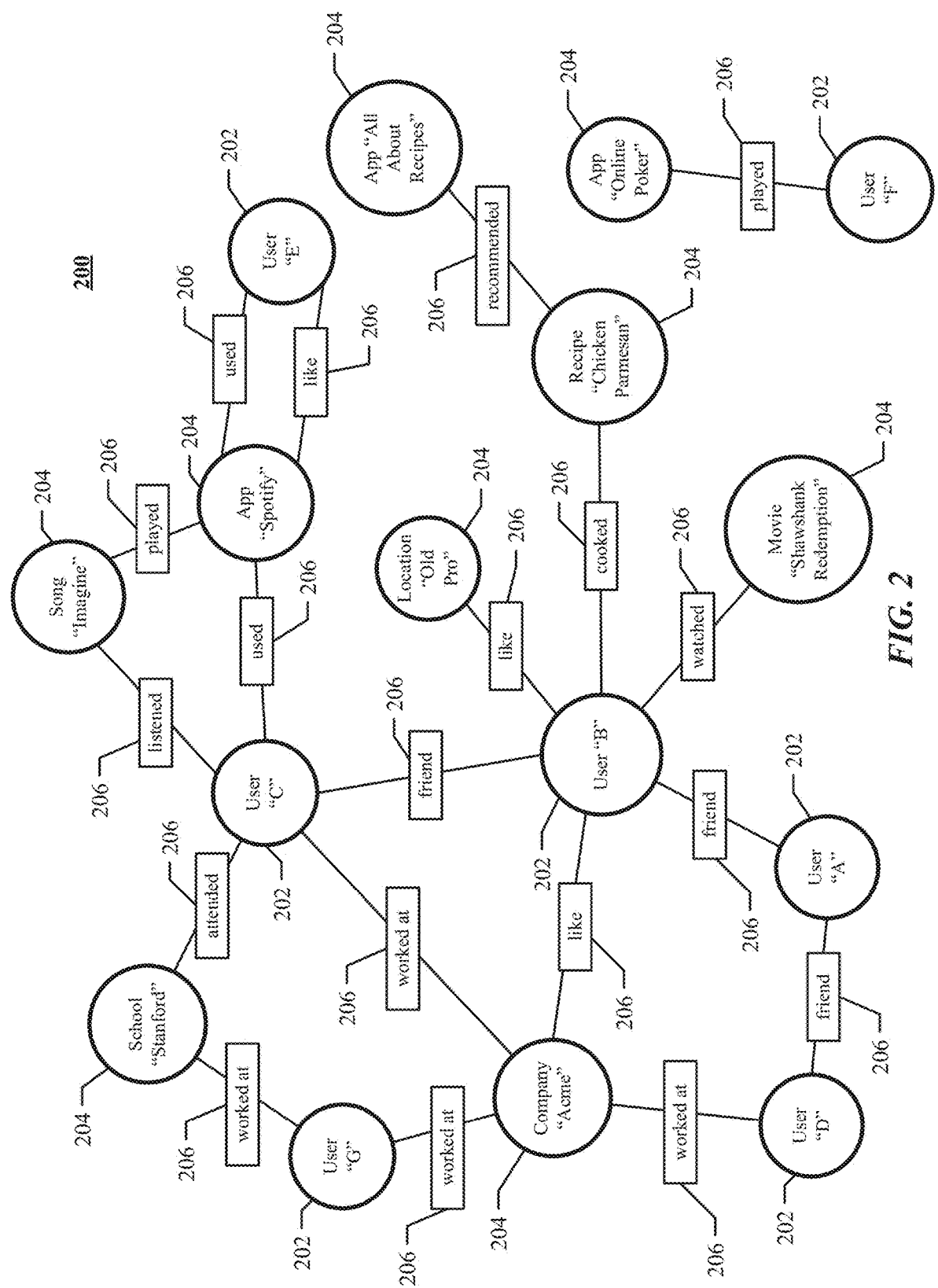
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 3:
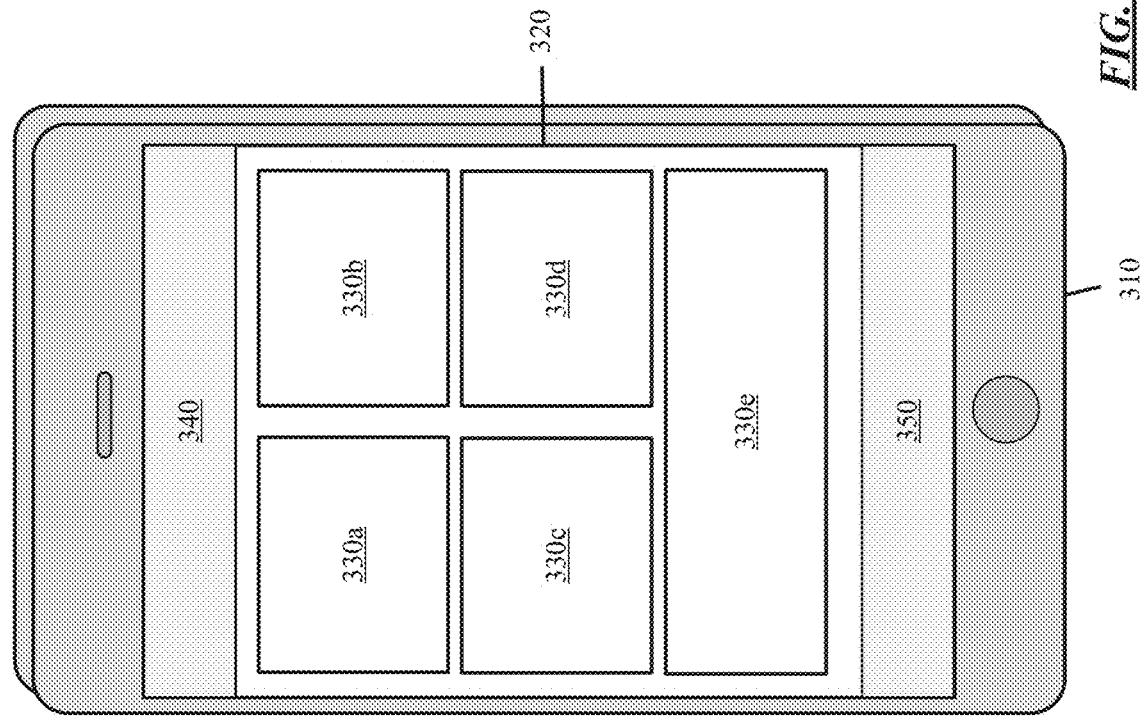
FIG. 3 illustrates an example document template.

FIG. 3 illustrates an example document template 320 displayed on the display of client device 310. In particular embodiments, document template 320 may comprise elements, such as elements 330*a-e*, header element 340, or footer element 350. The document template may comprise a layout (e.g., a particular arrangement of elements). For example, document template 320 depicted in FIG. 3 shows a particular layout for elements 330*a-e*, header element 340, and footer element 350. Although FIG. 3 depicts a particular layout of elements in document template 320, this disclosure contemplates that a document template may have any suitable layout, any suitable elements, and any suitable number of elements.

In particular embodiments, elements may contain one or more content items. For example, formatted text 370 may determine the content item contained by header element 340. In this example, the text "Mad Hatter's Emporium"

may be a content item contained by header element 340. Similarly, formatted text 360*a-e* may correspond to content items contained by elements 330*a-e*. For example, formatted text 360*a* may include the image or the location of the image kingcrown.jpg, which is contained by element 330*a*; formatted text 360*b* may include the video or the location of the video teaparty.avi, which is contained by element 330*b*; formatted text 360*c* may contain a text content item contained by element 330*c*; formatted text 360*d* may contain or locate text and audio hatterquote.wav, which may be contained by element 330*d*; and formatted text 360*e* may include or locate a gallery (e.g., a collection of multiple images, videos, or any other aggregation of multiple content items) with images, which is contained by element 330*e*.

In particular embodiments, content items in elements may be determined by parsing formatted text (e.g., text written in a markup language that contains annotations that are syntactically distinguishable from other text), such as formatted text 370 and formatted text 360*a-e*. As an example and not by way of limitation, the content items may be determined by Extensible Markup Language (XML) formatted text, XML User Interface Language (XUL) formatted text, HyperText Markup Language (HTML) formatted text, Extensible HyperText Markup Language (XHTML) formatted text, Scalable Vector Graphics (SVG) formatted text, or any other suitable formatted text. In some embodiments, the content items may be determined from formatted text associated with a Rich Site Summary (RSS) feed (e.g., an RSS feed may include formatted text in XML format). In some embodiments, content items may be determined based in part on annotations of formatted text. For example, formatted text 370 includes the annotations "<header>" and "</header>", which may serve to demarcate the portion of text that corresponds to header element 340. As another example, formatted text 360*b* includes the annotations "<url>" and "</url>", which may indicate the name ("teaparty.avi") and location of the video file corresponding to the video content item which is contained by element 330*b*. In some embodiments, content items may be received by social-networking system 160 from a user of social-networking system 160, an entity of social-networking system 160, an entity external to social-networking system 160, or any other appropriate source.

In particular embodiments, an element may include metadata (e.g., data about the element or the content item in the element). In some embodiments, the metadata may be provided by a composing user. For example, a composing user may provide an XML file that determines metadata of an element. In some embodiments, the metadata may be associated with a user-characteristic. For example, formatted text 360*a* may indicate that the crown depicted in the image kingcrown.jpg is for users with large heads with the annotation "<property>Large head</property>".

In particular embodiments, document template 320 may be rendered based on visual configuration information. For example, a template file may contain data that includes visual configuration information. Visual configuration information may determine for a document template the display order of elements, the type of elements, the display size of elements, etc. In some embodiments, visual configuration information may indicate the type or location of content items for one or more elements of a document. For example, a template file may contain visual configuration information that indicates that an element is of the image type (e.g., the element is or will contain an image content item). In some embodiments, visual configuration information may indicate which annotations in content data correspond to which element of a document template. For example, visual configuration information may indicate that the content item associated with element 330*a* is indicated by the annotation "<image>", which may indicate that kingcrown.jpg is the content item that will be placed in element 330*a* because formatted text 360*a* has annotations "<image>" and "</image>" and contains "kingcrown.jpg". In some embodiments, a template file may be determined by formatted text. For example, formatted text 370 may contain or locate template file "MHE_03.tmpt," which may indicate the size and position of header element 340, elements 330*a-e* and footer element 350 and indicate which of the formatted text 360*a-e* and formatted text 370 correspond to which of the elements of document template 320.

Figure 4:
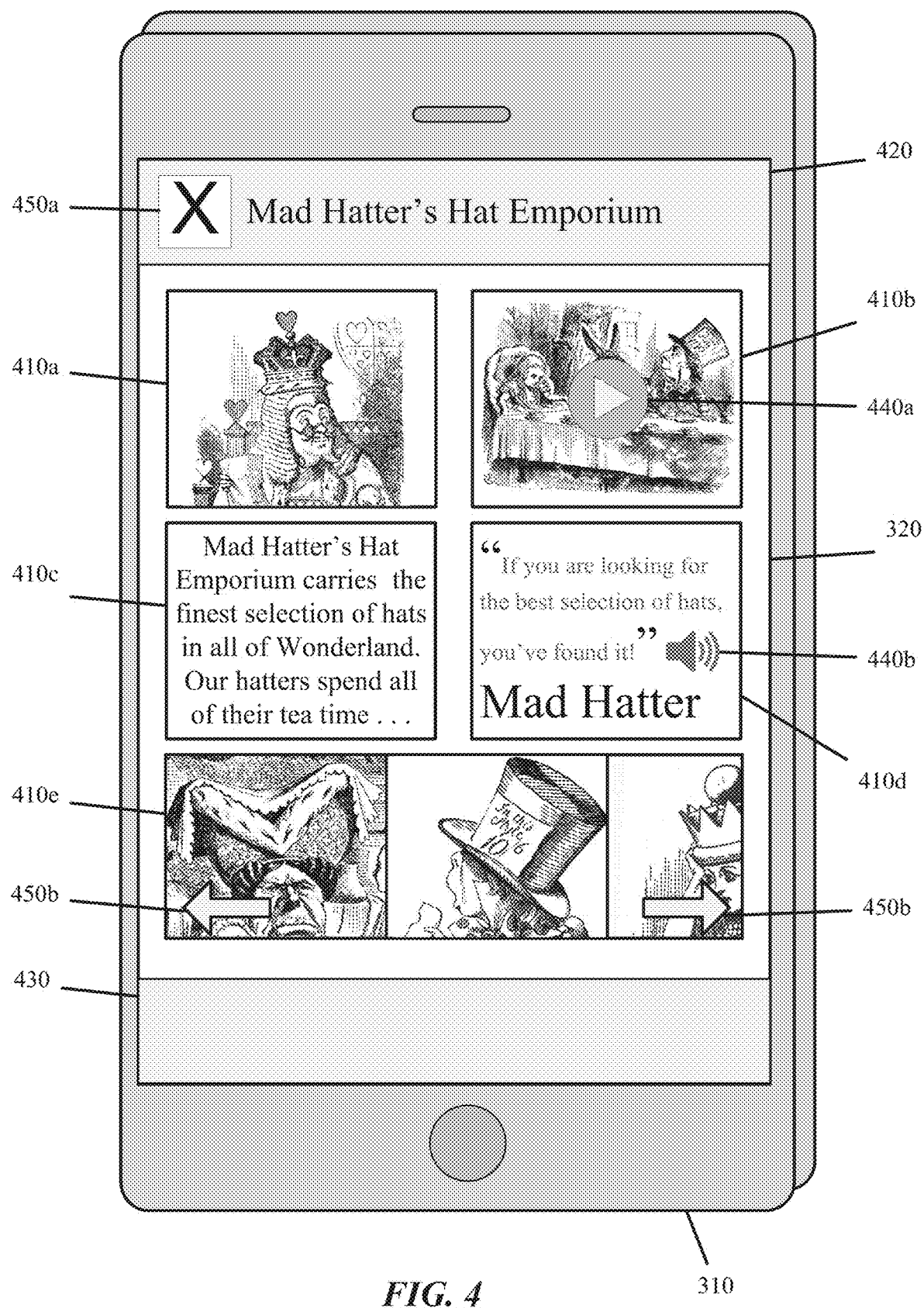
FIG. 4 illustrates an example document.

FIG. 4 illustrates an example document 420. Document 420 may be the result of putting the content items determined by formatted text 360*a-e* and formatted text 370 in elements 330*a-e* and header element 340 using document template 320 from FIG. 3. For example, content item 410*a* may be kingcrown.jpg, as indicated in formatted text 360*a*. As another example, content item 410*b* may be the video teaparty.avi, as indicated in formatted text 360*b*. As another example, content item 410*c* may be text that may be the result of placing the text between "<content>" and "</content>", as indicated in formatted text 360*c*, into element 330*c*. As another example, content item 410*d* may be an audio file and associated text that may be the result of placing the text between "<quote>" and "</quote>" and call-to-action 440*b* linking to audio file "hatterquote.wav," as indicated in formatted text 360*d*, into element 330*d*. As another example, content item 410*e* may be a gallery containing the images "hat1.jpg," "hat2.jpg," and "hat3.jpg," as indicated by formatted text 360*e*. As another example, footer element 430 may be left blank, as there may be no corresponding formatted text that determines a content item for the footer.

In some embodiments, content items may include a call-to-action. A call-to-action may be an item that solicits action from a user. For example, call-to-action 440*a* may be a play button that solicits a user to press the button and play video content item 410*b*. As another example, call-to-action 440*b* may be an icon depicting a speaker that solicits a user to press the icon and play an audio clip. Although FIG. 4 illustrates particular example call-to-action elements or content, this disclosure contemplates any suitable call-to-action. In some embodiments, a user may interact with a call-to-action to initiate a transaction, access or link to additional content, access another software application, set a reminder with respect to the document, send a communication, interact with an entity of social-networking system 160, share content on social-networking system 160, or any other suitable action. For example, a call-to-action may create an appointment for a calendar software application, send a text to a contact on a user device, like a particular entity on social-networking system 160, etc.

In particular embodiments, content items may include navigation items. Navigation items may allow a user to navigate to another document (e.g., a link that directs a user to the other document), navigate away from the current document, or alter the view on the current document. For example, navigation item 450*a* may be a button that may allow a user to navigate away from the current document when pressed. As another example, navigation items 450*b* may allow a user to scroll through images in gallery content item 410*e*. Although FIG. 4 illustrates particular navigation items, this disclosure contemplates any suitable navigation items.

In particular embodiments, content items may include, as an example and not by way of limitation, text (which may be HTML-linked), an image, a 3D graphic, a video, an animation, an effect (e.g., zooms, fades, wipes, etc.), audio, an ADOBE FLASH file, any suitable combination of content items, or any other suitable content. For example, content item 410d may be a combination of text, an image/call-to-action (the speaker icon), and an audio file (the speaker icon may link to an audio file). As another example, content item 410e may be a gallery that contains multiple images and has navigation items 450b that allow a user to scroll left and right and examine the images in the gallery.

In particular embodiments, one or more elements may be expandable or collapsible. An expandable or collapsible element may allow a user to expand the element (e.g., the element may take up more space on the document) or collapse the element (e.g., the element may take up less space on the document). For example, content item 410c may be in an expandable and collapsible element. This may allow a user to interact with the element (e.g., by a gesture, voice command, etc.) to alter the size of the element. In some embodiments, when the element expands, it may show more or less content. For example, as the element containing content item 410c expands, it may show progressively more of the text determined by formatted text 360c. In some embodiments, there may be a visual indicator that indicates that an element is expandable or collapsible. For example, a visual indicator may be an ellipsis; an arrow, triangle, plus/minus, or carrot icon; or any other suitable visual indicator.

Figure 5A:
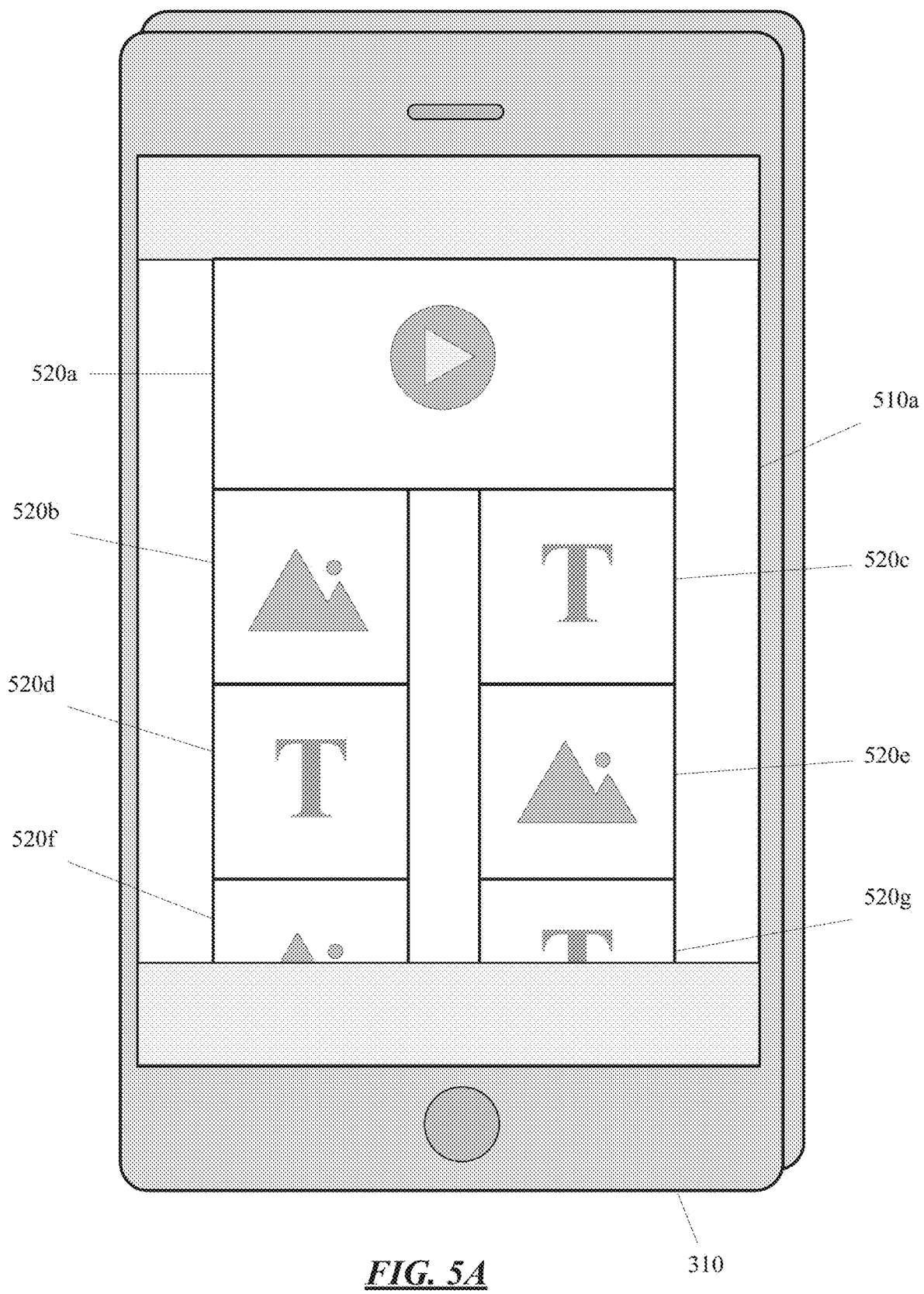
FIG. 5A illustrates an example first document template.
Figure 5B:
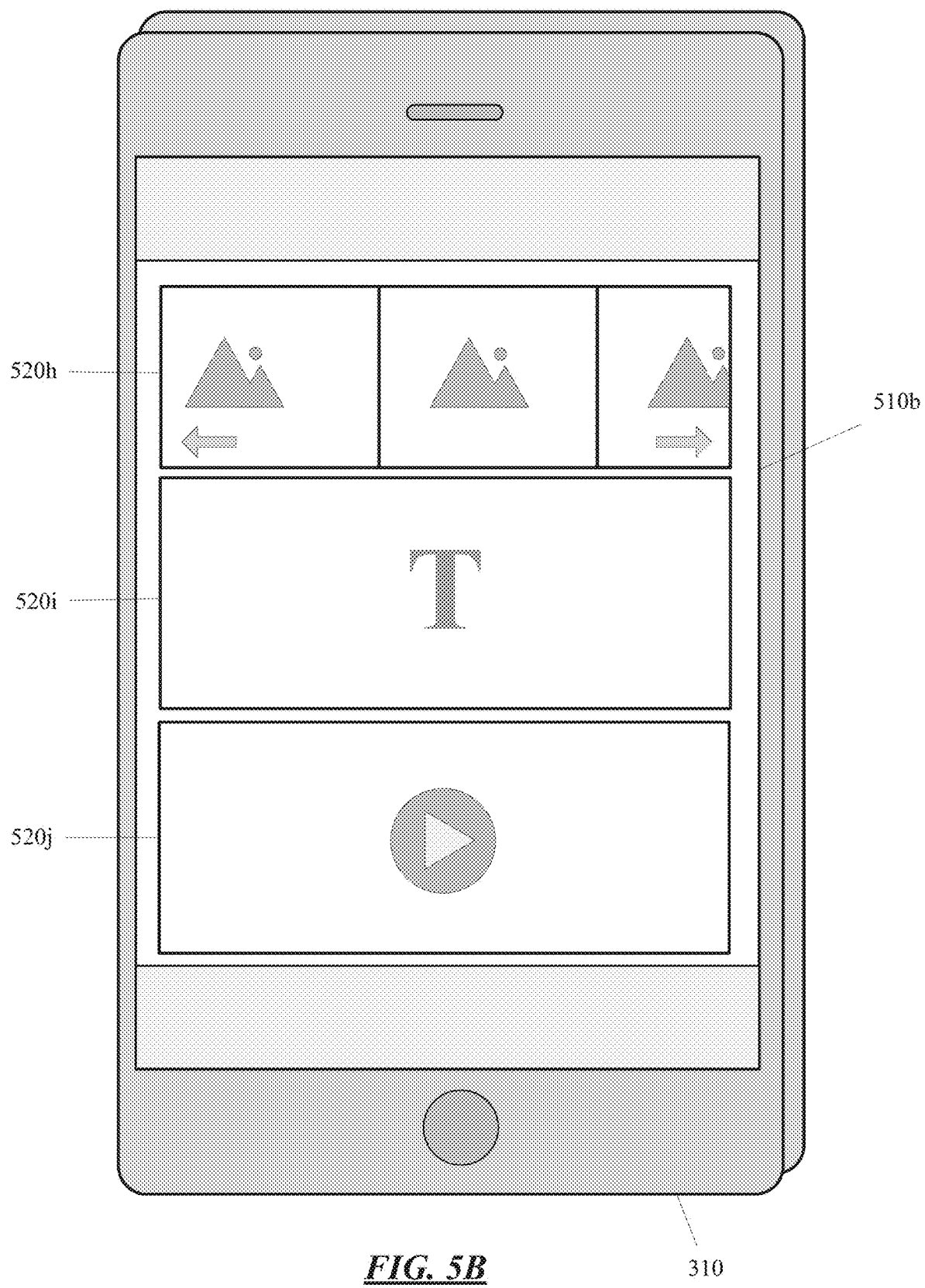
FIG. 5B illustrates an example alternate document template.

FIGS. 5A-B illustrate an example first document template and an example alternate document template. FIG. 5A illustrates an example first document template 510a. In this example, element 520a, which contains a video content item, is at the top of the document. Additionally, elements 520b, 520e, and 520g, which contain image content items, are interspersed with elements 520c, 520d, and 520g, which contain text content items.

FIG. 5B illustrates an example alternate document template 510b, which may be an alternate of document template 510a. In this example, element 520h, located at the top of document template 510b, may contain a gallery of images content item; element 520i, located in the middle of document template 510b, may contain a text content item; and element 520j, located at the bottom of document template 510b, may contain a video content item.

In particular embodiments, content items corresponding to a set elements of document template 510a may be included in one or more elements of alternate document template 510b. For example, the video content item contained by element 520a in document template 510a may correspond to the video content item contained by element 520j in alternate document template 510b (e.g., the content item in the alternate document template may be the same, substantially similar, related to, part of, or include the content item in the first document template). As another example, image content items contained by elements 520b, 520e, and 520f of document template 510a may be included in the galley content item contained in element 520h of document template 510b. In some embodiments, not all content items of a first document template may be included in an alternate document template. As an example, the text content items in elements 520b and 520e of document template 510a may correspond to the text content item in element 520i in document template 510b, but the text content item in element 520g in document template 510a may not be included in any element of document template 510b. As another example, an alternate document template may include a content item that was not in any elements of a first document template. In some embodiments, content items from a first document template may be altered for presentation in an alternate document template. For example, a video content item in an element of a first document template may be presented as an image content item (e.g., an image still from the video content item from the first document template) in an element of an alternate document template.

Figure 6A:
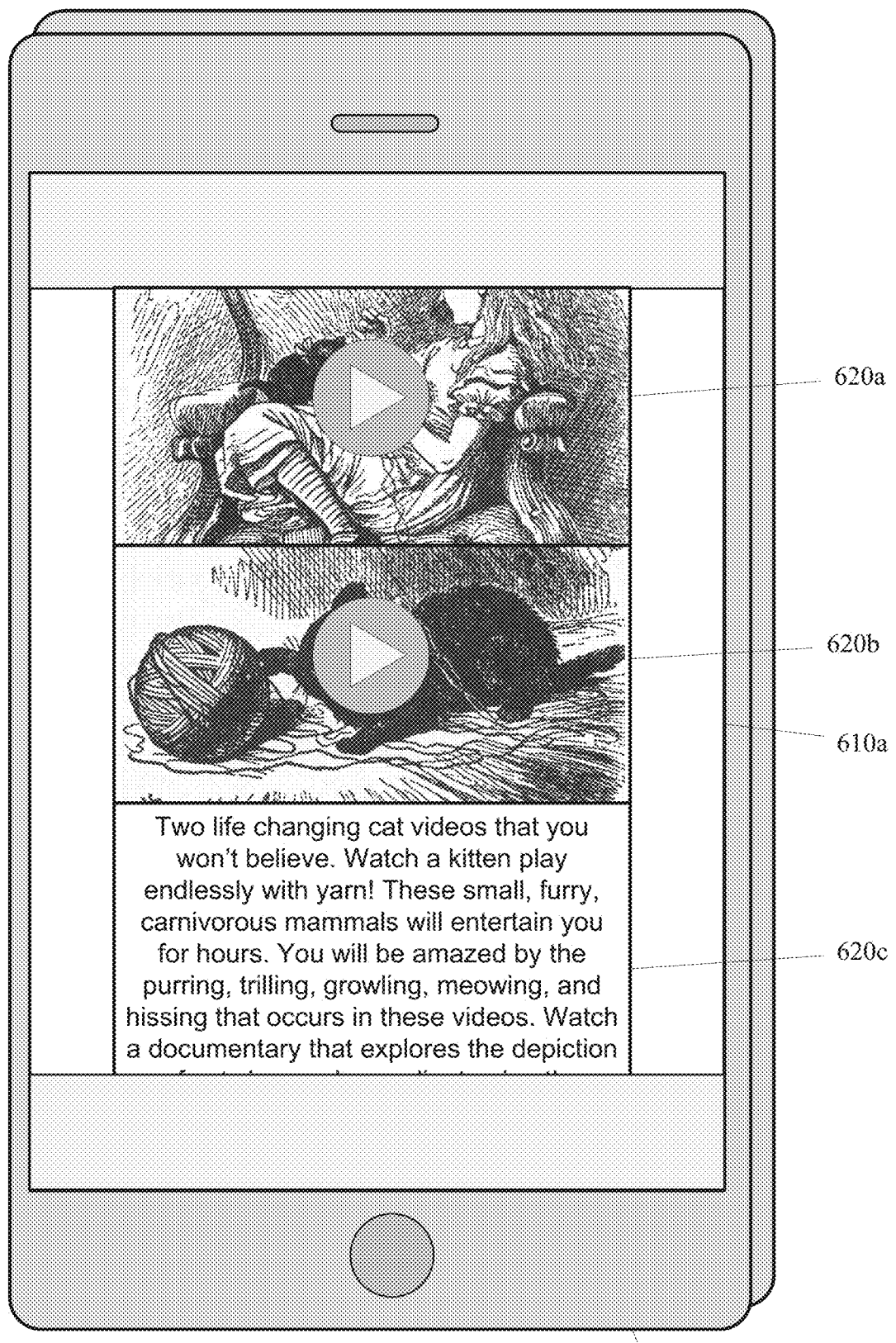
FIG. 6A illustrates an example document configured in accordance with a first document template.
Figure 6B:
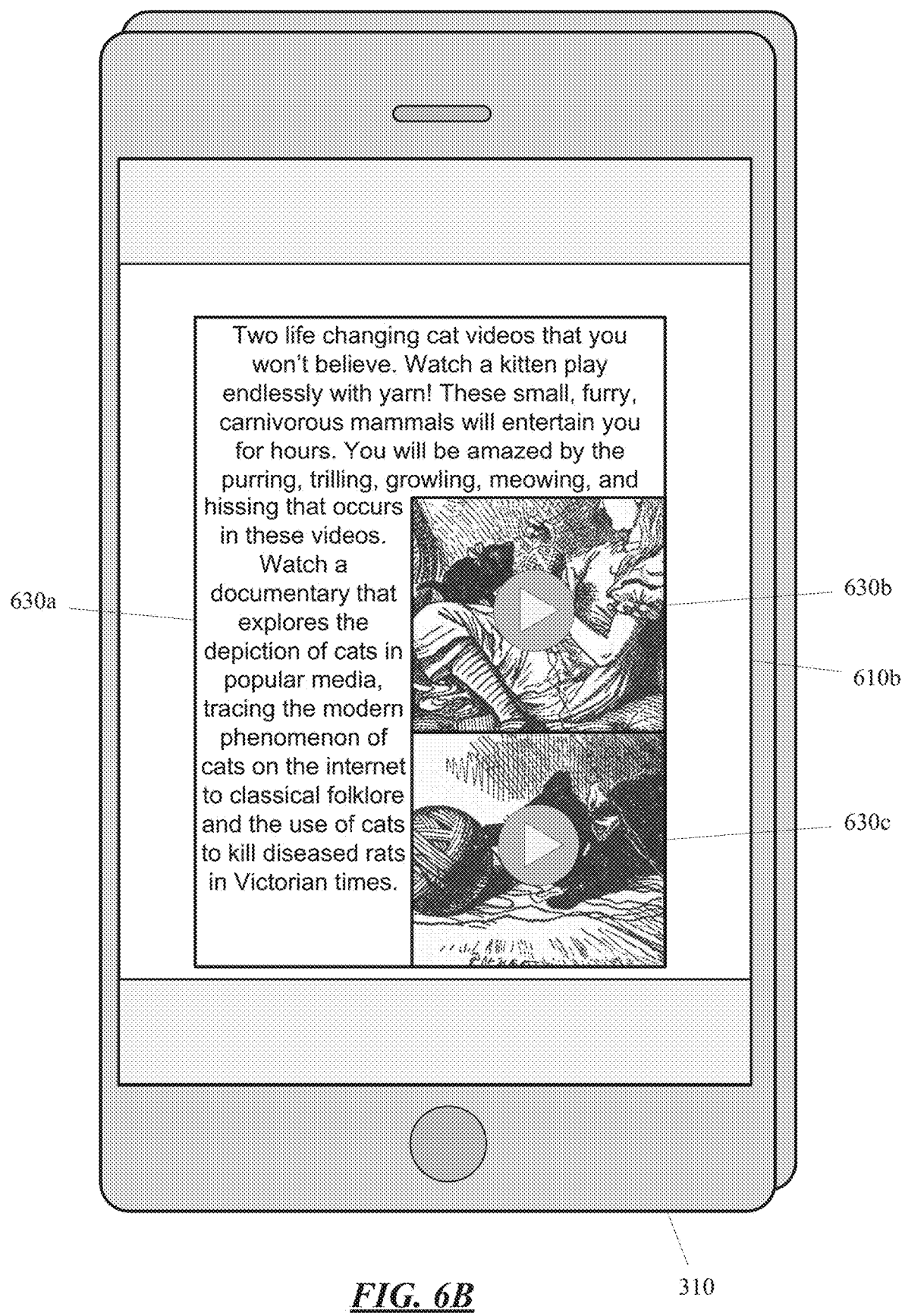
FIG. 6B illustrates an example document configured in accordance with an alternate document template.

FIGS. 6A-B illustrate an example first document 610a arranged in accordance with a first document template and an example document 610b arranged in accordance with an alternate document template. FIG. 6A illustrates an example document 610a arranged in accordance with a first document template. In this example, elements 620a-b may each contain a video content item related to a video about cats and element 620c may contain a text content item that includes a paragraph about cats and cat videos. In some embodiments, a document or document template, such as document 610a, may be larger than a display that it is displayed on. For example, element 620c in FIG. 6A may extend down past the edge of the display on client device 310. In some embodiments, the view of a document on a display may change in response to user input. In this example, a user may gesture by swiping downward on the touchscreen display of client device 310, which may cause the view of document 610a to move downward.

FIG. 6B illustrates an example document 610b, which may be configured in accordance with an alternate document template of a document template used to determine the layout of document 610a. In this example, element 630a may contain a text content item corresponding to the content item contained by element 620c, element 630b may contain a video content item corresponding to the content item contained by element 620a, and element 630c may contain a content item corresponding to the content item contained by element 620b.

Figure 7:
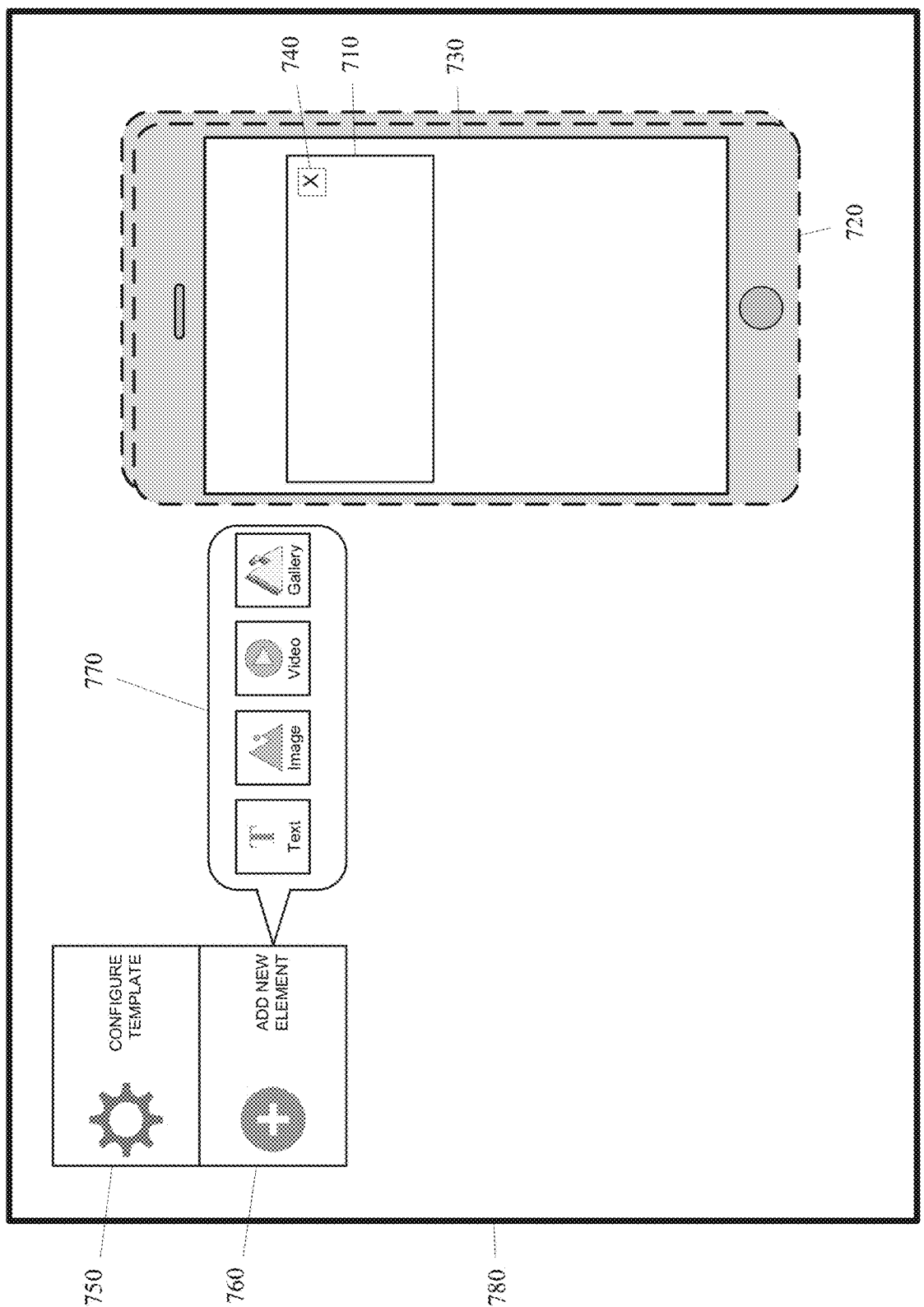
FIGS. 7 and 8 illustrate an example graphical user interface for creating documents.
Figure 8:
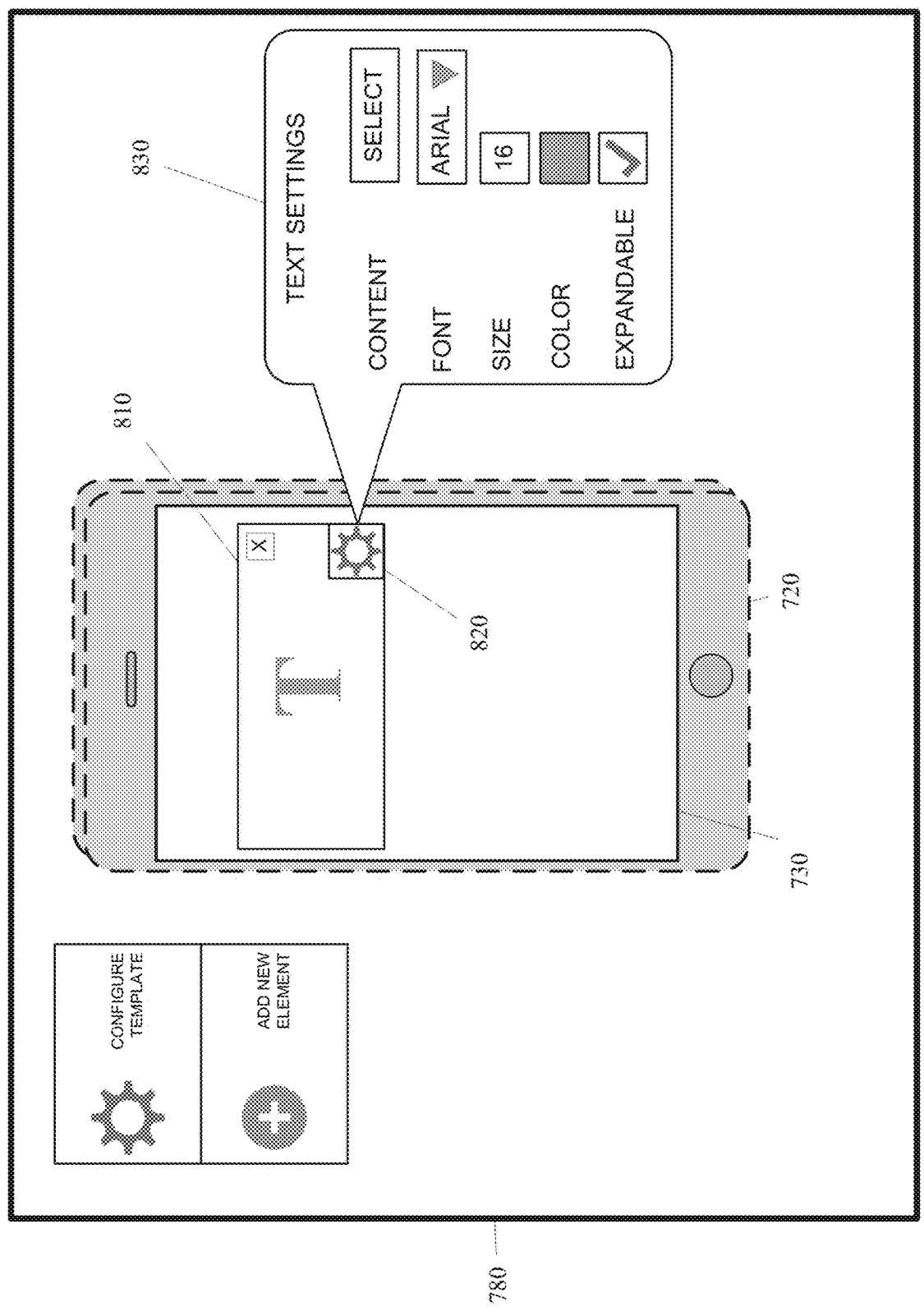

FIGS. 7 and 8 illustrate an example graphical user interface (GUI) for creating documents. The GUI may be rendered on a display, such as display 780. In particular embodiments, a GUI may be a user interface (UI) that uses graphical icons or visual indicators displayed on a client system to provide a user with the ability to interact with a client system. Although an example GUI may be described, this disclosure contemplates use of any suitable UI to create documents. For example, a UI may be a voice UI (e.g., a UI that allows a user to interact with a client system through voice or speech), a gesture UI (e.g., a UI that provides a user with the ability to interact with a client system through the motion or state of some part of the user's body), or any other suitable type of UI.

In particular embodiments, a GUI for creating documents may include a virtual client device 720. A virtual client device may be a depiction of a client device rendered on display 780 that in turn may depict a document or document template, such as document template 730, that a composing user (e.g., a user that creates or modifies a document or document template) is creating or altering via the GUI. As a composing user creates or alters a document or document template via a GUI, virtual client device 720 may update in real time to depict how the document being created would be displayed on a client device. In some embodiments, a composing user can configure virtual client device 720 to be a virtualization of a particular client device (e.g., a user may select whether the virtual client device depicted is an IPHONE, a SAMSUNG GALAXY S6, a tablet, a laptop computer, etc.). Additionally or alternatively, an actual client device may be configured to display a depiction of a document template as a composing user creates or alters a document via the GUI. Although FIGS. 7 and 8 depicts a way for a composing user to visualize a document or document template via a virtual client device or client device as it is created or altered, this disclosure contemplates that a GUI may provide no such functionality.

In particular embodiments, a GUI may allow a composing user to add elements to or remove elements from a document template. For example, button 760 in FIG. 7 may allow a composing user to add an element, such as element 710, to document template 730. In some embodiments, a composing user may have an option to resize and position an element as the element is created. For example, when a composing user presses button 760, the GUI may render a graphical representation of an element which the composing user may be able to position or resize via gesture. Additionally or alternatively, when a composing user presses button 760, an element may be created with some default position or size. In some embodiments, a composing user may remove an element from a document or document template via a GUI. For example, a composing user pressing button 740 may have the effect of removing element 710 from document template 730. Although particular user interaction, particular GUI functionality, and particular buttons may be depicted, this disclosure contemplates any suitable GUI that may allow a composing user to add, remove, or alter elements in any suitable manner.

In particular embodiments, elements may be typed elements. An element may be typed when it is added, after it is added, or not at all. For example, FIG. 7 illustrates an example menu 770, which includes type options a composing user may select when adding an element. In this example, menu 770 allows a composing user to add a typed elements such as a text element, an image element, a video element, or a gallery element. Although menu 770 depicts these example element types, this disclosure contemplates any suitable element type. For example, an element may be a header or footer element, a sidebar element, a media display element, an expandable or collapsible element, an animated element, a text block element, a call-to-action element, an audio element, a multi-type element, or any other suitable type of element. In some embodiments, a composing user may select or alter the type of an element after it is added. For example, FIG. 8 illustrates an example GUI. In this example, a composing user may use button 820 to being up menu 830. Menu 830 may give the composing user the option to change element 810 to an expandable element. Although this example depicts a particular element type, this disclosure contemplates that an element may change to or from any element type after the element is added, and that the element may change type in any suitable manner.

In particular embodiments, a GUI may allow a composing user to configure visual metrics for an element of a document template. Visual metrics of an element may determine the position, shape, size, transparency, type, rotation, background, or other aspect of an element. In some embodiments, options for visual metrics may depend on the type, if any, of an element. For example, FIG. 8 illustrates an example GUI with a button 820 that may allow a composing user to configure visual metrics for element 810. In this example, element 810 may be a text element, and when a user presses button 810, menu 830 may be displayed with visual metrics options that are specific to text elements. For example, menu 830 may allow a composing user to change the font, size, or color of the text in element 810. Although this example depicts particular visual metrics for text elements, this disclosure contemplates any suitable visual metrics for any element type. For example, a video element may have visual metrics that correspond to the resolution of the video, the color balance of the video, whether the video plays automatically when the document is opened, whether the video also includes a call-to-action play button, the volume of the video, etc. In some embodiments, visual metrics for elements may be the same regardless of the type of element or regardless of whether the element has a type.

In particular embodiments, a document or document template may include visual configuration information. Visual configuration information may determine the position, order, size, arrangement, layout, or other properties of elements within an associated document or document template. In some embodiments, a GUI may allow a composing user to alter visual configuration information. For example, FIG. 7 depicts an example GUI that may allow a composing user to alter configuration information by interacting with button 750. Additionally or alternatively, visual configuration information may be altered as a user performs other interactions with a document template via a GUI. For example, a composing user may resize element 710 by performing a gesture on display 780, and as the composing user resizes element 710, visual configuration information associated with document template 730 may update to reflect the change.

In particular embodiments, a document or document template may include a category associated with the document or document template. A category may include a user characteristic, a client device characteristic, or any other suitable information. For example, a document template might include a category that designates users with the characteristic of being between the ages of 18 to 25. As another example, a document may have a category that includes client devices running the ANDROID operating system. In some embodiments, a composing user may configure a document template to include a category to indicate a preference that the document template be used when a document is viewed by a user or on a client device that matches the category. As explained more below, content may be displayed to a user or on a client device using one of multiple document templates based on a category of a document or document template.

Figure 9:
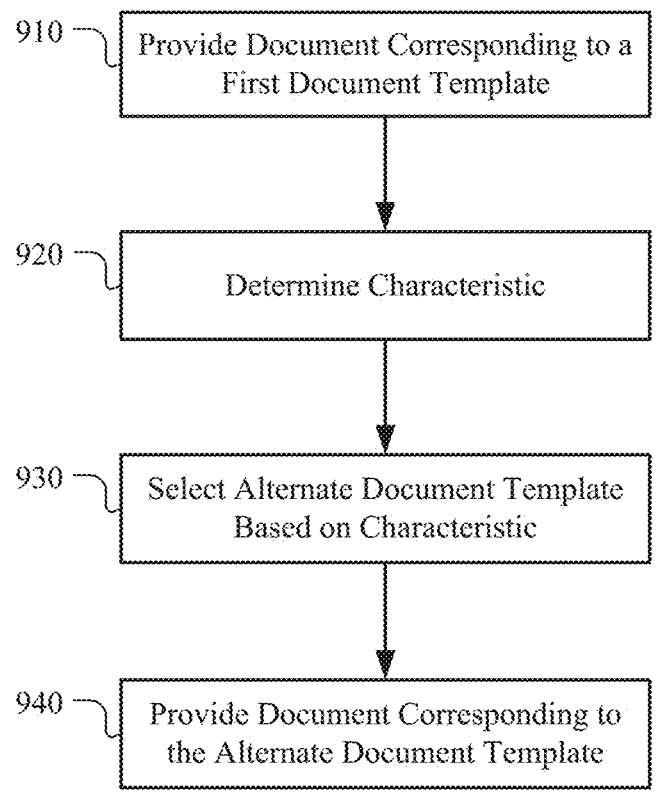
FIG. 9 illustrates an example method for providing documents to a user based on a characteristic of the user.

FIG. 9 illustrates an example method 900 for providing documents to a client device of a user based on a characteristic associated with the user. In step 910, social-networking system 160 may provide a document for display to a client device. For example, social-networking system 160 may provide a document to user Alice Liddell's mobile phone. The document may include one or more elements containing one or more content items. For example, the document may be provided to Alice's mobile phone and may include content relating to Mad Hatter's Hat Emporium (MHHE). In some embodiments, the layout of the document may be generated in accordance with a document template. In some embodiments, the document may be provided in response to receiving a request from a client device of a user.

In some embodiments, as discussed above, the content of a document template used to generate a document may correspond to formatted text (e.g., XML or formatted text from an RSS feed). As an example, MHHE may provide to social-networking system 160 a file containing formatted text in XML format that determines the content items (e.g., by specifying the location of the content items). As another example, MHHE may maintain an RSS feed which includes XML formatted text that determines a document template for the document and social-networking system 160 may access that RSS feed to generate a document. As another example, MHHE may maintain an online website containing text written in HTML format which social-networking system 160 may access to generate a document.

In step 920, social-networking system 160 may determine a characteristic associated with the user. A characteristic associated with the user may be, as an example and not by way of limitation, demographic information for the user, a demographic group associated with the user, the user's location, an interest of the user, user profile information, social-networking information for the user (e.g., a user-group of social-networking system 160 associated with the user, a user-interaction on social-networking system 160 by the user, etc.), a client device profile for a client device of the user, or any other suitable characteristic. By, accessing Alice's user profile, social-networking system 160 may determine that Alice is age 10, that Alice is female, and that Alice lives in the United Kingdom. As another example, Alice may be requesting a document on her mobile phone using an application and the application may send to social-networking system 160 a client device profile that indicates that Alice's mobile phone is an IPHONE, that the operating system is version 5.1.1 of IOS, that English is the localized language on the mobile phone, and that the FACEBOOK application is installed on the mobile phone.

In step 930, social-networking system 160 may select an alternate document template based on a characteristic associated with the user. The alternate document template may include a set of elements from the elements of the first document template. In this example, Alice may have initially received a document that was configured in accordance with first document template 510*a*, illustrated in FIG. 5A. Social-networking system 160 may determine in step 920 that Alice has historically interacted with documents containing gallery elements more than other documents and that Alice does not typically interact as much with documents that display a video element as the topmost element. Based on these characteristics, social-networking system may select document template 510*b*, illustrated in FIG. 5B, which includes a gallery element 520*h* and has video element 520*j* placed at the bottom of the document. In some embodiments, an alternate document template may be a separate document template from a first document template. Additionally or alternatively, an alternate document template may be an updated version of a first document template.

In step 940, social-network 160 may provide the document corresponding to the alternate document template. In some embodiments, the content items of the alternate document template may correspond to the set of elements of the first document template. Using the example where Alice is provided a document configured in accordance with alternate document template 510*b*, the content items in the alternate document template may correspond to one or more elements of the first document template 510*a*. As described above, the content items that may be placed in elements document template 510*b* may have corresponding content items in document template 510*a*. In some embodiments, an additional document may be provided based on a category of the provided document and based on an association of the category with the additional document.

In a second example, social-networking system 160 may provide to Alice a document related to adopting cats (step 910). The document may include content items such as images of cats, videos of cats, and text related to cats. Alice may be retrieving this document in a non-browser application, such as the FACEBOOK application. The composing user may have created multiple document templates to display the content items. In this example, one document template may emphasize how cute cats are by prominently displaying images and videos of cats. Another document template may emphasize the health benefits of owning cats (e.g., lower levels of stress, lower incidence of cardiovascular disease, etc.) via emphasizing related text content items. Yet another document template may be optimized for mobile devices by arranging the elements so that the content may be displayed on a smaller display.

In this example, an adoption agency may provide the content items for the document. The adoption agency may provide a custom file that specifies the content items and document template (e.g., a file in XML). The adoption agency may provide a number of cat images featuring different types of cats up for adoption (e.g., cats may range in age, physical condition, color, etc.). Each image may have an associated text content item that contains the cat's name and biographical information. There may also be video content items that correspond to the cats at the adoption agency. Details or metadata about each cat may be written into the XML file. For example, the XML file could specify for each cat its name, sex, age, whether it is spayed or neutered, etc.

In step 920, social-networking system 160 may determine a characteristic of Alice. Social-networking system 160 may determine that Alice frequently posts on social-networking system 160 about calico cats, that Alice is 10 years old, that Alice is viewing the document on a mobile phone, that Alice is located one block away from the storefront of the adoption agency, and that Alice has joined the user group on social-networking system 160 that advocates for the adoption of disabled animals.

In step 930, social-networking system 160 may select an alternate document template based on the determined characteristics of Alice. The composing user in this example may have specified categories and a purpose for multiple document templates. The purpose of the document may be for users to adopt a cat from the adoption agency. Each document template may have one or more categories associated with it. In some embodiments, categories associated with documents may be explicitly associated by a composing user, by machine learning, or any other suitable way of associated a categories with a document. In this example, the document that emphasizes the health benefits of owning cats may be associated with a category of older users or with user's with stressful jobs via the composing user indicating the association within the XML file. There may be one or more templates that are associated with categories of users who are using mobile phones. In this example, document templates that include more video elements instead of image elements may be associated with younger users. Social-networking system 160 may also determine that younger users tend to spend a longer time lingering on a document template that includes more videos than images via machine learning, and an association between the document template and younger users may be stored. Further, Alice may have a characteristic of being friends with her mother on social-networking system 160. Alice's mother may have responded well to a particular document template, and that template may be selected as an alternate document template for Alice based on this characteristic.

In particular embodiments, multiple characteristics of a user may be used to select an updated document template. In particular embodiments, social-networking system 160 may determine a score for each element of a document template and for each characteristic of a user. In some embodiments, an aggregate score for an element may be determined by a weighted function (e.g., weighted arithmetic mean, weighted geometric mean, weighted harmonic mean, etc.) of each score for an element across the user characteristics. In this example, an element may be an image of an 11-year-old calico cat with one eye named "Kiwi" who is up for adoption. In this example, weights that sum to 1 may be assigned to various user characteristics. For example, a weight of 0.3 may be assigned to user posts about cats, a weight of 0.4 may be assigned to membership in user groups, and a weight of 0.3 may be assigned to user age. In some embodiments, the weights may be assigned based on the relative importance of the characteristic in effectuating a purpose of the document. In this example, the weights may have been assigned based on the likelihood (e.g., determined by historical statistics) that a user with those characteristics would adopt from the adoption agency. Social-networking system may then determine a score for each of Alice's characteristics for the element. In this example, each score may be from 0 to 1. In some embodiments, a score may represent a match between the element and the characteristics (e.g., the characteristics indicates that the user would be receptive to the element). Alice's post about calico cats may receive a score of 1 because Kiwi is a calico cat and Alice posted about calico cats, Alice's membership in the user group that advocates for disabled may receive a score of 1 because Kiwi has one eye, and Alice's age may receive a score of 0.4 because Kiwi is 11 years old and 10-year old girls like Alice tend to prefer younger kittens. Social-networking system 160 may then take a weighted average and assign the aggregate score of 0.82 to the element. A score may be similarly determined for other elements. In some embodiments, an updated document template may include elements based on the aggregated score of the elements. In this example, if 0.82 is a high score compared to other elements of a first document template, then the element with Kiwi's picture and associated text may be included in the updated document template. Although certain methods of calculating a weight, score, and aggregated score may be discussed, this disclosure contemplates any suitable method of calculating a weight, score, and aggregated score.

In particular embodiments, an alternate document template may be selected based on characteristics associated with Alice. The document template may feature video rather than images based on Alice's age. The document template may also include elements that contain information on Kiwi based on the aggregated score for that element. In some embodiments, the first set of elements may be optimized for display on a client device of the user based on a client device profile. In this example, based on the determination that Alice is using a mobile device to access the document, the document template may present the set of elements that include elements that are appropriate for a mobile device (e.g., elements of a size that fits on the display of the mobile device, elements with touchscreen interactivity navigation items, etc.). Based on the determination that Alice is within one block of the storefront of the adoption agency, an alternate document template may be selected that features a call-to-action within the element containing Kiwi's image that allows Alice to press a button and start navigation to the storefront of the adoption agency via a mapping software application.

In some embodiments, the alternate document template may be selected based on a category associated with a document template. In this example, a document template may be associated with a category that includes children under the age of 13. This document template may be selected based on the category because Alice is age 10. In some embodiments, the alternate document may be selected based on an indication of a particular purpose of the document. In this example, a document template may have an indicated purpose of getting users to adopt animals. An alternate document template may be selected based on an indicated purpose. For example, an alternate document template may be selected based on the adoption of cats by users who were provided the alternate document template in the past. In some embodiments, a particular purpose may be indicated by an entity associated with content items of the document. In this example, the adoption agency may have specified the purpose of the document (e.g., in the provided XML, file).

In particular embodiments, an element of a document template may be updated in response to a user-interaction. A user-interaction may include an interaction with an element, a time spent viewing the document, a time spent viewing a content item in an element of the document, a scroll velocity of a user through a set of elements of the document, a return visit to the document, or any other suitable user-interaction. In this example, Alice may have repeatedly requested (made return visits to) the document related to adopting cats. Alice may also have spent long periods of time watching videos related to cats, but only a small amount of time lingering on images of cats. Further, Alice may have scrolled quickly (high scroll velocity) through text related to cats. Based on these user-interactions, the document template may be updated to include more video and less images and text. In some embodiments, updating the element may include making available or enabling a user-action that is not currently available or enabled in response to a user-interaction that indicates that a user attempted to initiate the user-action. For example, Alice may have attempted to make a video in the document full screen by pressing a button that typically allows the user-action to make a video full screen. The element that Alice is interacting with, however, may not have the full screen functionality enabled. In response to Alice's user-interaction, the element may be updated to allow a user-action to make the video full screen. In some embodiments, updating an element may include adding an element, deleting an element, modifying the display size of an element, re-arranging the display order of elements, modifying an interaction associated with a call-to-action element, changing the content item associated with an element, etc. In step 940, a document may be provided to Alice's mobile device with content items corresponding to the first document configured in accordance with the alternate document template determine in step 930.

In particular embodiments, an element may be modified in response to receiving a request from a user associated with a user-characteristic based on metadata of the element associated with the user-characteristic. In this example, the element that contains the image of Kiwi may also contain metadata that provides information about Kiwi (e.g., that Kiwi is a calico cat, that Kiwi is 10 years old, etc.). The metadata may be determined by the XML file provided by the adoption agency. Based on a comparison of the metadata to Alice's user-characteristics (e.g., that Alice posts about calico cats, that Alice is a girl of age 10, etc.), the elements containing the image of Kiwi may be enlarged so that it takes up more of the screen and a call-to-action adoption button may be placed over the image of Kiwi. Although particular modifications of an element are discussed, this disclosure contemplates any suitable modification of an element in based on metadata of the element and an associated characteristic associated with the user.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for providing documents to a user based on a characteristic of the user including the particular steps of the method of FIG. 9, this disclosure contemplates any suitable method for providing documents to a user based on a characteristic of the user including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
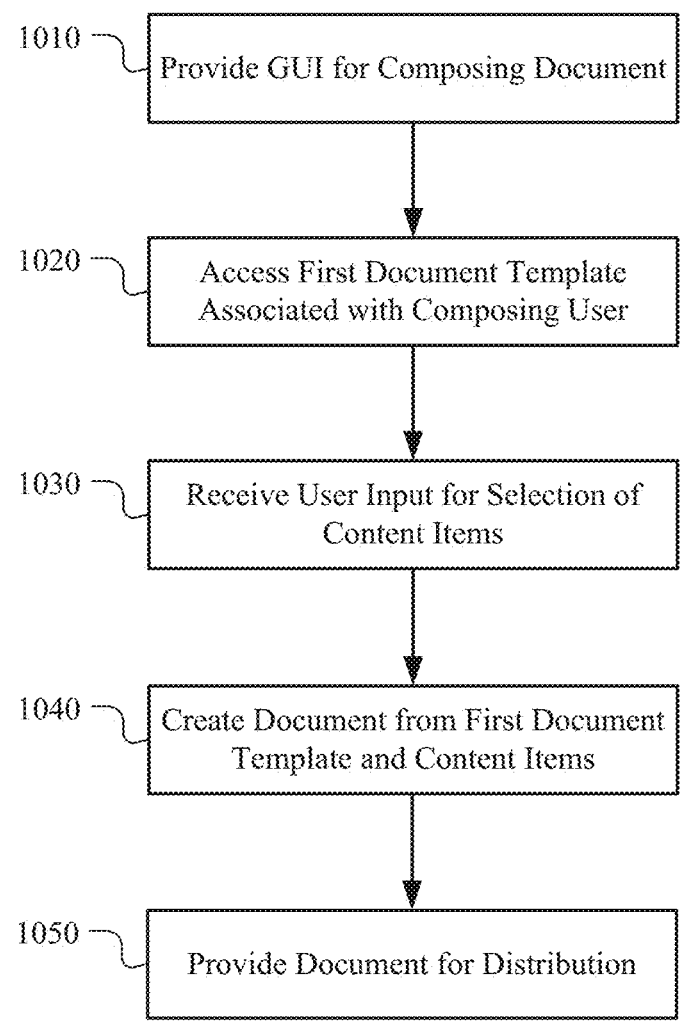
FIG. 10 illustrates an example method for creating a document based on input received from a composing user.

FIG. 10 illustrates an example method 1000 for creating a document based on input received from a composing user. In step 1010, a GUI is provided which may allow a composing user to compose a document. In some embodiments, a GUI may allow a user to compose a document by including a document template that the composing user may configure (e.g., creating, editing, altering, storing, or using a document template). As discussed above, a document template may include elements, each of which may include a content item. A document template may include visual configuration information for the document template or visual metrics for an element.

In step 1020, a first document template associated with the composing user may be accessed. In some embodiments, the first document template may be uniquely associated with the composing user, a particular category of users, a topic, a particular client device profile, or have any other suitable association. For example, a document template may be associated with client device profiles for mobile devices. As another example, a document template may be associated with a category of users that include males of age 18 to 34.

In particular embodiments, the first document template may be retrieved from storage. Additionally or alternatively, the first document template may be generated for the first time. In some embodiments, a user may provide input via the GUI to modify the preferred arrangements of one or more elements of a first document template, which may be stored as a second document template and may be associated with the composing user. Modifying the preferred arrangement may include, for example: adding an element, deleting an element, modifying the display size of an element, re-arranging the display order of elements, modifying an interaction associated with a call-to-action element, changing the content item associated with an element, etc.

In step 1030, the composing user may provide user input that may determine a content item for creating a document. For example, a composing user may provide XML formatted text that determines a content item, as described above. As another example, each element in the document template may allow a user to specify content items to be placed in an element via a GUI. In this example, the GUI may display a visual representation of the document template, as in FIG. 8. The element may have a button 820 that allows a user to configure element 810. Menu 830 may display when a composing user presses button 820, which may include an option to select content for element. A user may provide formatted text, the location of formatted text, a file containing content, or the location of a file containing content to select a content item for creating a document.

In step 1040, a document is created from the first document template and the selected content items. In particular embodiments, the content items may be automatically associated with elements of the document template. For example, XML formatted text may provide for the location of content items to be included in the document. In this example, the XML formatted text may provide metadata about the content items, such as the name, type, size, etc. In this example, each element may have corresponding information, such as a type, and content items may be associated with elements based on the corresponding element metadata and element types. In some embodiments, a composing user may select particular content items and associate them with particular elements. In this case, content items may be associated with elements automatically by retrieving the association provided by the composing user.

In step 1050, a document may be provided for distribution to a user of social-networking system 160. In some embodiments, the document may be provided through a non-browser application. In some embodiments, the document may be configured in accordance with the document template. In some embodiments, the document may be distributed on a newsfeed of a user of social-networking system 160.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for creating a document based on input received from a composing user including the particular steps of the method of FIG. 10, this disclosure contemplates any suitable method for creating a document based on input received from a composing user including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
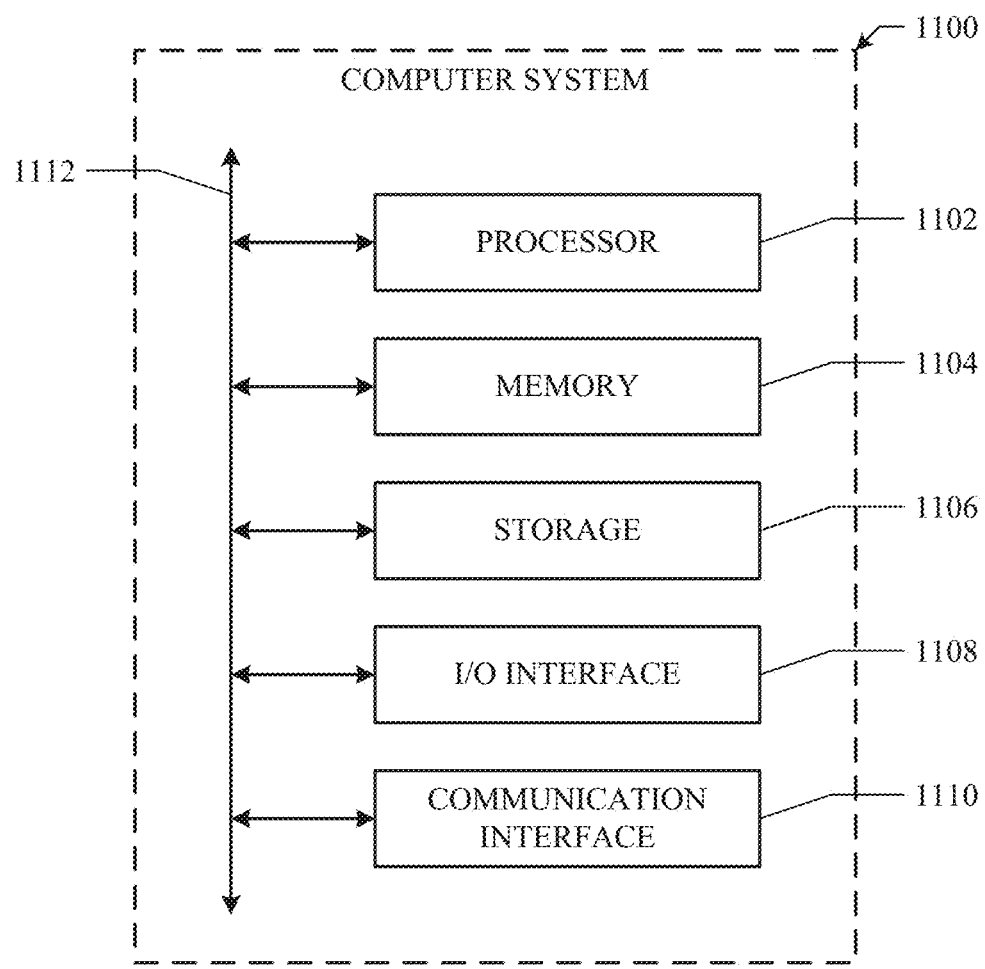
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-onchip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a computing device, providing a document for display in a non-browser application of a client device of a user associated with a social-networking system, wherein the non-browser application is associated with the social-networking system, wherein the document corresponds to a first document template, and wherein the document comprises:
        one or more content items corresponding to one or more elements, wherein each element is a container for a content item; and
        information corresponding to one or more characteristics of users of the social-networking system;

by the computing device, determining a first characteristic associated with a user of the social-networking system, wherein the first characteristic is associated with a preferred layout of the elements based on a type of content item associated with each of the elements, wherein the first characteristic is based on previous user-interactions with content items on the social-networking system by the user, and wherein the previous user-interactions indicate which elements associated with the one or more elements of the document extend user-interaction with the one or more content items;

by the computing device, based on the first characteristic, selecting an alternate document template including a first set of elements from the one or more elements, wherein the first set of elements comprises the elements associated with the one or more elements of the document that extend user-interaction with the one or more content items; and by the computing device, providing the document with content items corresponding to the first set of elements and configured in accordance with the alternate document template for display.

2. The method of claim 1, wherein:
the providing the document for display is in response to a request from the client device of the user;
the first characteristic comprises a client device profile; and
the first set of elements are optimized for display on the computing device based on the client device profile.

3. The method of claim 1, wherein the first document template comprises a visual configuration information and visual metrics for the elements.

4. The method of claim 3, wherein the visual configuration information and visual metrics comprise:
a display order of the one or more elements; and
a display size of each of the one or more elements.

5. The method of claim 1, wherein the elements comprise:
a header element or footer element of a document;
a media display element;
an expandable and collapsible element;
an animated element;
a text block element;
a call-to-action element; or
a multi-type element.

6. The method of claim 1, wherein the content items are received by the social-networking system from:
a user of the social-networking system;
an entity of the social-networking system; or
an entity external to the social-networking system.

7. The method of claim 1, wherein the first characteristic is further based on:
a demographic group associated with the user;
a user-group of the social-networking system associated with the user;
an interest of the user; or
one or more social-networking connections of the user to one or more other entities on the social-networking system.

8. The method of claim 1, further comprising receiving an indication of one or more user-interactions with one or more of the first set of elements from the user.

9. The method of claim 8, wherein the user-interactions comprise:
an interaction with an element;
a time spent viewing the document;
a time spent viewing a content item contained in a particular element of the first set of elements;
a scroll velocity through the first set of elements; or
a return visit to the document comprising the first set of elements.

10. The method of claim 8, further comprising updating the first set of elements in response to the user-interaction.

11. The method of claim 10, wherein updating the first set of elements comprises:
receiving an indication of a user-interaction with an element of the document, wherein the user-interaction comprises a user-action not enabled with the element; and
in response to the indication, enabling the user-action for the element.

12. The method of claim 10, wherein updating the first set of elements comprises:
adding one or more elements;
deleting one or more elements;
modifying a display size of one or more of the elements;
re-arranging the one or more elements in a second order;
modifying an interaction associated with a call-to-action element; or
changing a content item associated with a particular element.

13. The method of claim 1, further comprising:
identifying a first category associated with the document;
selecting one or more additional documents associated with the first category; and
providing the additional documents for distribution to the user.

14. The method of claim 13, wherein the determining the alternate document template of the first set of elements for the document is based on the first category.

15. The method of claim 1, wherein the first characteristic is further based on an indication of a particular purpose of the document.

16. The method of claim 15, wherein the indication of a particular purpose is received from an entity associated with the content items.

17. The method of claim 1, further comprising:
determining a second characteristic associated with the user;
selecting a second alternate document template comprising a layout of a second set of elements from the elements, wherein the selecting is based on both the first characteristic and the second characteristic; and
providing a document configured in accordance with the second alternate document template.

18. The method of claim 17, wherein selecting the second set of elements is further based on:
for each characteristic, determining a score associated with each element of the elements for the characteristic;
for each characteristic, weighing the score by a factor associated with the characteristic; and
determining an aggregate score for each element for all characteristics.

19. One or more computer-readable non-transitory storage media embodying software that is operable when executed to:
provide a document for display in a non-browser application of a client device of a user associated with a social-networking system, wherein the non-browser application is associated with the social-networking system, wherein the document corresponds to a first document template, and wherein the document comprises:

one or more content items corresponding to one or more elements, wherein each element is a container for a content item; and information corresponding to one or more characteristics of users of the social-networking system;

determine a first characteristic associated with a user of the social-networking system, wherein the first characteristic is associated with a preferred layout of the elements based on a type of content item associated with each of the elements, wherein the first characteristic is based on previous user-interactions with content items on the social-networking system by the user, and wherein the previous user-interactions indicate which elements associated with the one or more elements of the document extend user-interaction with the one or more content items;

select, based on the first characteristic, an alternate document template including a first set of elements from the one or more elements, wherein the first set of elements comprises the elements associated with the one or more elements of the document that extend user-interaction with the one or more content items; and provide the document with content items corresponding to the first set of elements and configured in accordance with the alternate document template for display.

20. A system comprising: one or more processors; and a non-transitory memory coupled to the processors comprising instructions executable by the processors, the processors operable when executing the instructions to:

provide a document for display in a non-browser application of a client device of a user associated with a social-networking system, wherein the non-browser application is associated with the social-networking system, wherein the document corresponds to a first document template, and wherein the document comprises:

one or more content items corresponding to one or more elements, wherein each element is a container for a content item; and information corresponding to one or more characteristics of users of the social-networking system;

determine a first characteristic associated with a user of the social-networking system, wherein the first characteristic is associated with a preferred layout of the elements based on a type of content item associated with each of the elements, wherein the first characteristic is based on previous user-interactions with content items on the social-networking system by the user, and wherein the previous user-interactions indicate which elements associated with the one or more elements of the document extend user-interaction with the one or more content items;

select, based on the first characteristic, an alternate document template including a first set of elements from the one or more elements, wherein the first set of elements comprises the elements associated with the one or more elements of the document that extend user-interaction with the one or more content items; and provide the document with content items corresponding to the first set of elements and configured in accordance with the alternate document template for display.

\* \* \* \* \*